United States Patent
Taue et al.

(10) Patent No.: US 7,478,692 B2
(45) Date of Patent: Jan. 20, 2009

(54) ELECTRIC VEHICLE

(75) Inventors: Jun Taue, Shizuoka-ken (JP); Gen Mizutani, Shizuoka-ken (JP); Kiyohisa Sugii, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 258 days.

(21) Appl. No.: 11/429,116

(22) Filed: May 4, 2006

(65) Prior Publication Data
US 2006/0260851 A1 Nov. 23, 2006

Related U.S. Application Data

(63) Continuation of application No. PCT/JP2004/015850, filed on Oct. 26, 2004.

(30) Foreign Application Priority Data
Nov. 5, 2003 (JP) .............................. 2003-375177

(51) Int. Cl.
*B60K 6/24* (2007.10)
(52) U.S. Cl. .................... 180/65.4; 180/65.3; 180/65.2; 701/22; 903/941; 903/942; 903/943
(58) Field of Classification Search ................ 180/65.1, 180/65.2, 65.3, 65.4; 701/22; 903/940, 941, 903/942, 943
See application file for complete search history.

(56) References Cited
U.S. PATENT DOCUMENTS
3,566,165 A 2/1971 Lohr 3,921,745 A 11/1975 McCulloch et al.
4,132,281 A 1/1979 Gaddi (Continued)

FOREIGN PATENT DOCUMENTS
EP 0 555 773 8/1993

(Continued)

OTHER PUBLICATIONS

International Search Report for PCT Application No. PCT/JP04/015850, mailed Feb. 15, 2005.

(Continued)

*Primary Examiner*—Christopher P Ellis
*Assistant Examiner*—John D. Walters
(74) *Attorney, Agent, or Firm*—Knobbe Martens Olson & Bear, LLP

(57) ABSTRACT

In an electric vehicle driven by a drive motor with electric power generated by an engine-driven generator and with electric power from a battery, the electric vehicle includes a residual battery power detecting module for detecting a residual power capacity of the battery, and a motor control module. When the residual power capacity decreases below an established (e.g., preset) lower limit, the motor control module lowers a voltage of an accelerator output signal, which is output in response to a rotational angle of an accelerator, to a value less than a voltage given under a condition where the residual power capacity is greater than or equal to an established (e.g., preset) lower limit. In this manner, the larger rotational movement of the accelerator required to control a rotational speed of the drive motor provides a rider with a sensory indication of the operating state of the vehicle (e.g., the residual power capacity of the battery).

6 Claims, 12 Drawing Sheets

U.S. PATENT DOCUMENTS

| | | | |
|---|---|---|---|
| 4,467,407 | A | 8/1984 | Asano |
| 4,536,668 | A | 8/1985 | Boyer |
| 4,763,538 | A | 8/1988 | Fujita et al. |
| 4,829,208 | A | 5/1989 | Uchino |
| 5,014,800 | A | 5/1991 | Kawamoto et al. |
| 5,024,113 | A | 6/1991 | Ito et al. |
| 5,036,213 | A | 7/1991 | Isozumi |
| 5,087,229 | A | 2/1992 | Hewko et al. |
| 5,144,183 | A | 9/1992 | Farrenkopf |
| 5,272,938 | A | 12/1993 | Hsu et al. |
| 5,294,853 | A | 3/1994 | Schluter et al. |
| 5,304,878 | A | 4/1994 | Oda et al. |
| 5,442,250 | A | 8/1995 | Stridsberg |
| 5,505,277 | A | 4/1996 | Suganuma et al. |
| 5,570,752 | A | 11/1996 | Takata |
| 5,581,136 | A | 12/1996 | Li |
| 5,588,498 | A | 12/1996 | Kitada |
| 5,595,257 | A | 1/1997 | Yoshida et al. |
| 5,691,584 | A | 11/1997 | Toida et al. |
| 5,755,304 | A | 5/1998 | Trigg et al. |
| 5,798,702 | A | 8/1998 | Okamoto et al. |
| 5,818,134 | A | 10/1998 | Yang et al. |
| 5,826,675 | A | 10/1998 | Yamamoto |
| 5,899,828 | A | 5/1999 | Yamazaki et al. |
| 5,915,493 | A | 6/1999 | Nakayama |
| 5,960,901 | A | 10/1999 | Hanagan |
| 6,011,366 | A | 1/2000 | Murakami et al. |
| 6,046,518 | A | 4/2000 | Williams |
| 6,048,289 | A | 4/2000 | Hattori et al. |
| 6,116,363 | A * | 9/2000 | Frank ................. 180/65.2 |
| 6,121,711 | A | 9/2000 | Nakahara et al. |
| 6,155,366 | A | 12/2000 | Lin |
| 6,158,543 | A | 12/2000 | Matsuto et al. |
| 6,190,282 | B1 | 2/2001 | Deguchi et al. |
| 6,190,283 | B1 * | 2/2001 | Uchida ................. 477/5 |
| 6,199,652 | B1 | 3/2001 | Mastroianni et al. |
| 6,252,377 | B1 | 6/2001 | Shibutani et al. |
| 6,276,481 | B1 | 8/2001 | Matsuto et al. |
| 6,315,068 | B1 * | 11/2001 | Hoshiya et al. ........... 180/65.2 |
| 6,321,863 | B1 | 11/2001 | Vanjani |
| 6,522,959 | B1 * | 2/2003 | Sawamura et al. ............ 701/22 |
| 6,590,306 | B2 | 7/2003 | Terada |
| 6,736,227 | B2 | 5/2004 | Huang et al. |
| 6,752,226 | B2 | 6/2004 | Naito et al. |
| 6,765,327 | B2 | 7/2004 | Hashimoto et al. |
| 6,799,650 | B2 * | 10/2004 | Komiyama et al. ......... 180/65.2 |
| 6,823,954 | B2 * | 11/2004 | Shimabukuro et al. ..... 180/65.2 |
| 6,994,652 | B2 | 2/2006 | Atarashi et al. |
| 7,006,906 | B2 | 2/2006 | Kobayashi et al. |
| 7,017,694 | B2 | 3/2006 | Shirazawa |
| 7,023,102 | B2 | 4/2006 | Itoh |
| 7,047,116 | B2 | 5/2006 | Ishikawa et al. |
| 7,071,642 | B2 | 7/2006 | Wilton et al. |
| 7,077,223 | B2 * | 7/2006 | Kubodera et al. .......... 180/65.2 |
| 7,104,347 | B2 | 9/2006 | Severinsky et al. |
| 7,223,200 | B2 | 5/2007 | Kojima et al. |
| 7,228,209 | B2 | 6/2007 | Izawa et al. |
| 7,328,091 | B2 * | 2/2008 | Kimura ................. 701/22 |
| 7,342,342 | B2 | 3/2008 | Naitou et al. |
| 2001/0010439 | A1 | 8/2001 | Klingler et al. |
| 2003/0019455 | A1 | 1/2003 | Seiji et al. |
| 2003/0026118 | A1 | 2/2003 | Ikimi |
| 2003/0221887 | A1 | 12/2003 | Hsu |
| 2004/0055799 | A1 | 3/2004 | Atarashi et al. |
| 2004/0060753 | A1 | 4/2004 | Masatoshi et al. |
| 2004/0158365 | A1 | 8/2004 | Tabata et al. |
| 2004/0173393 | A1 | 9/2004 | Laszlo et al. |
| 2004/0213371 | A1 | 10/2004 | Bruder et al. |
| 2005/0111246 | A1 | 5/2005 | Lai |
| 2006/0030454 | A1 | 2/2006 | Uchisasai et al. |
| 2006/0032690 | A1 | 2/2006 | Inomoto et al. |
| 2006/0090945 | A1 | 5/2006 | Ishida et al. |
| 2006/0207812 | A1 | 9/2006 | Saitou |
| 2006/0219447 | A1 | 10/2006 | Saitou et al. |
| 2006/0289208 | A1 | 12/2006 | Katsuhiro et al. |
| 2006/0289214 | A1 | 12/2006 | Katsuhiro et al. |
| 2007/0017723 | A1 | 1/2007 | Terada et al. |
| 2007/0029121 | A1 | 2/2007 | Saitou et al. |
| 2007/0216226 | A1 | 9/2007 | Matsumoto et al. |
| 2007/0216452 | A1 | 9/2007 | Matsumoto et al. |

FOREIGN PATENT DOCUMENTS

| | | |
|---|---|---|
| EP | 0 604 981 A2 | 7/1994 |
| EP | 0 819 561 A2 | 1/1998 |
| EP | 0 980 821 A2 | 2/2000 |
| EP | 1 065 362 A1 | 1/2001 |
| EP | 1 151 892 | 11/2001 |
| EP | 1 270 302 | 1/2003 |
| EP | 1 447 282 A2 | 8/2004 |
| EP | 1 447 530 | 8/2004 |
| EP | 1 518 737 | 3/2005 |
| EP | 1 526 020 | 4/2005 |
| EP | 1 574 379 | 9/2005 |
| EP | 1 705 049 A2 | 9/2006 |
| JP | 2-7702 | 1/1990 |
| JP | 2-37027 | 2/1990 |
| JP | 03-215154 | 9/1991 |
| JP | 4-185207 | 7/1992 |
| JP | 5-300712 | 11/1993 |
| JP | 8-175474 | 7/1996 |
| JP | 8-175477 | 7/1996 |
| JP | 08-256403 | 10/1996 |
| JP | 09-191501 | 7/1997 |
| JP | 10-080001 | 3/1998 |
| JP | 11-122886 | 4/1999 |
| JP | 11-034965 | 9/1999 |
| JP | 2000-337192 | 5/2000 |
| JP | 2000-261911 | 9/2000 |
| JP | 2000-261988 | 9/2000 |
| JP | 2000-343964 | 12/2000 |
| JP | 2001-105899 | 4/2001 |
| JP | 2001-298901 | 10/2001 |
| JP | 2001-341685 | 12/2001 |
| JP | 2002-021601 | 1/2002 |
| JP | 2002-262404 | 9/2002 |
| JP | 2002-325412 | 11/2002 |
| JP | 2003-191761 | 7/2003 |
| JP | 2003-191883 | 7/2003 |
| JP | 2004-007919 | 1/2004 |
| JP | 2004-060498 | 2/2004 |
| JP | 2004-166369 | 10/2004 |
| JP | 2005-098251 | 4/2005 |
| WO | WO 00/43259 A1 | 7/2000 |
| WO | WO 2004/054836 | 7/2004 |

OTHER PUBLICATIONS

European Search Report for EP 1 270 395, dated Mar. 23, 2005.
European Search Report for EP 06 01 2978, dated Dec. 20, 2006.
European Search Report for EP 06 01 2979, dated Oct. 3, 2006.
European Search Report for EP 07 00 3224, dated Apr. 24, 2007.
European Search Report for EP 07 00 5511 dated May 16, 2007.
Non-final Office Action mailed Oct. 15, 2007 received in U.S. Appl. No. 11/389,514.
Non-final Office Action mailed Nov. 20, 2007 received in U.S. Appl. No. 11/426,244.
Non-final Office Action mailed May 22, 2008 received in U.S. Appl. No. 11/426,244.

* cited by examiner

ELECTRIC VEHICLE

CROSS-REFERENCE TO RELATED APPLICATIONS

This application is a continuation application of PCT Application No. PCT/JP04/015850, which was filed on Oct. 26, 2004 and published in Japanese on May 19, 2005 as WO 05/044613. The above PCT application claims priority to Japanese Patent Application No. 2003-375177, filed on Nov. 5, 2003.

BACKGROUND OF THE INVENTION

1. Field of the Invention

This invention relates to an electric vehicle powered by a drive motor driven with electric power generated by an engine-driven generator and electric power from a battery.

2. Description of the Related Art

Conventional electric vehicles include hybrid-type electric vehicles, which incorporate an engine-driven generator for charging a battery during operation to supply electric power to a drive motor driving a drive wheel.

One such hybrid-type vehicle, described in Japanese Publication No. JP 2001-105899, includes a structure in which the electric power generated by the generator and the electric power of the battery are supplied to the drive motor so that the vehicle is driven only with the power of this drive motor.

Such conventional hybrid-type vehicles can employ a control system to control a vehicle speed via the rider rotating and holding an accelerator grip. Such a control system is conventional in vehicles driven with internal combustion engines. However, the sound generated by the hybrid-type vehicle is smaller than that of vehicles driven with internal combustion engines. Thus, there is no auditory feedback (e.g., sound) from engine following an operation of the accelerator grip. Consequently, some riders may find it more difficult to sense the operational state of the vehicle.

SUMMARY OF THE INVENTION

In accordance with one aspect of the invention, a hybrid-type electric vehicle is provided that can assist in providing a rider with a sensory indication of a running state of the vehicle.

In accordance with an aspect of the invention, an electric vehicle is provided comprising an engine-driven generator and a battery connected to the generator. The electric vehicle also comprises an electric drive motor propelling the vehicle, the drive motor being driven with electric power generated by the engine-driven generator and electric power from a battery. A residual battery power detector cooperates with the battery to detect a residual power capacity of the battery. The electric vehicle also comprises an accelerator operated by a user to control vehicle speed, the accelerator outputting a control signal indicative of a desired motor speed set by the user. The electric vehicle also comprises a hybrid controller managing the operation of the drive motor based upon the control signal output by the accelerator and upon a signal from the residual battery power detector, wherein the controller is configured to operate the drive motor, for a given control signal value, at a slower rotational speed when the residual power capacity of the battery falls below an established lower limit than when the residual power capacity is greater than or equal to the established lower limit.

In accordance with another aspect of the invention, an electric vehicle is provided comprising a prime mover powered by fuel, a generator driven by the prime mover, and an electric drive motor propelling the vehicle, the drive motor being driven at least in part by electric power generated by the generator. The electric vehicle also comprises a residual fuel detector configured for detecting a residual fuel amount of a fuel tank coupled to the prime mover, and an accelerator operated by a user to control vehicle speed, the accelerator outputting a control signal indicative of a desired motor speed set by the user. The electric vehicle also comprises a hybrid controller managing the operation of the drive motor based upon the control signal output by the accelerator and upon a signal from the residual fuel detector. The controller is configured to operate the drive motor, for a given control signal value, at a slower rotational speed when the residual fuel amount falls below an established lower limit than when the residual fuel amount is greater than or equal to the established lower limit.

In accordance with a further aspect of the invention, an electric vehicle is provided comprising an engine-driven generator, a battery connected to the generator, and an electric drive motor propelling the vehicle, the drive motor being driven with electric power generated by the engine-driven generator and electric power from a battery. The electric vehicle also comprises an accelerator operated by a user to control vehicle speed, the accelerator outputting a control signal indicative of a desired motor speed set by the user, and a detector configured to detect an abnormal operating condition of the vehicle. The electric vehicle also comprises a hybrid controller managing the operation of the drive motor based upon the control signal output by the accelerator and upon a signal from the detector. The controller is configured to lower the maximum value of the accelerator control signal, when the abnormal operating condition is detected, to a value lower than the maximum voltage provided under a normal operating condition, so as to reduce the maximum rotational speed of the drive motor.

In accordance with a further aspect of the invention, an electric vehicle is provided comprising an engine-driven generator, a battery connected to the generator, and an electric drive motor propelling the vehicle, the drive motor being driven with electric power generated by the engine-driven generator and electric power from a battery. The electric vehicle also comprises a vehicle state detector configured to detect a vehicle state of operation, and a controller configured to control the operation of an engine coupled to the generator, such that the controller varies an engine speed of the engine in response to the detected vehicle state.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The drawings include the following 12 figures.

DETAILED DESCRIPTION OF THE PREFERRED EMBODIMENT

Figure 1:
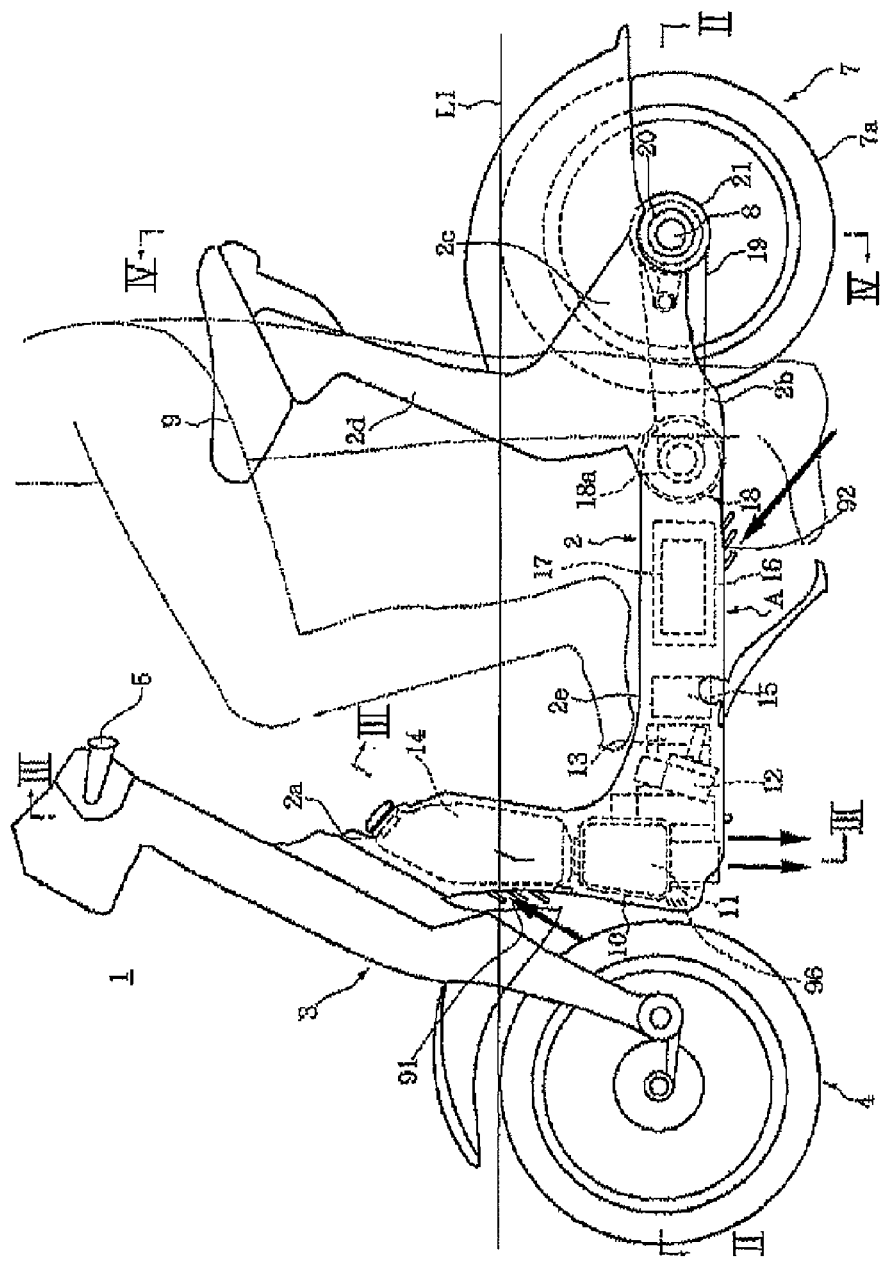
FIG. 1 is a side elevational schematic view of a hybrid type electric vehicle.
Figure 2:
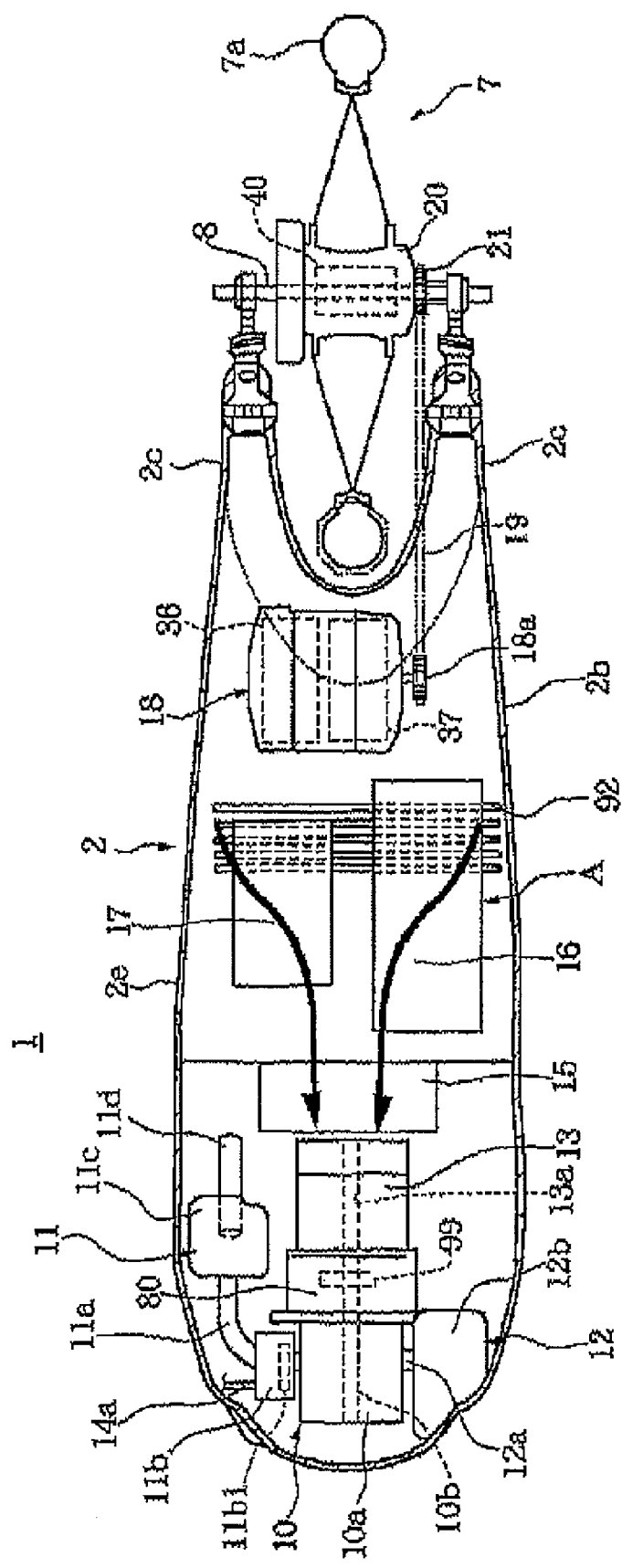
FIG. 2 is a cross sectional schematic view taken along the line II-II of FIG. 1.
Figure 3:
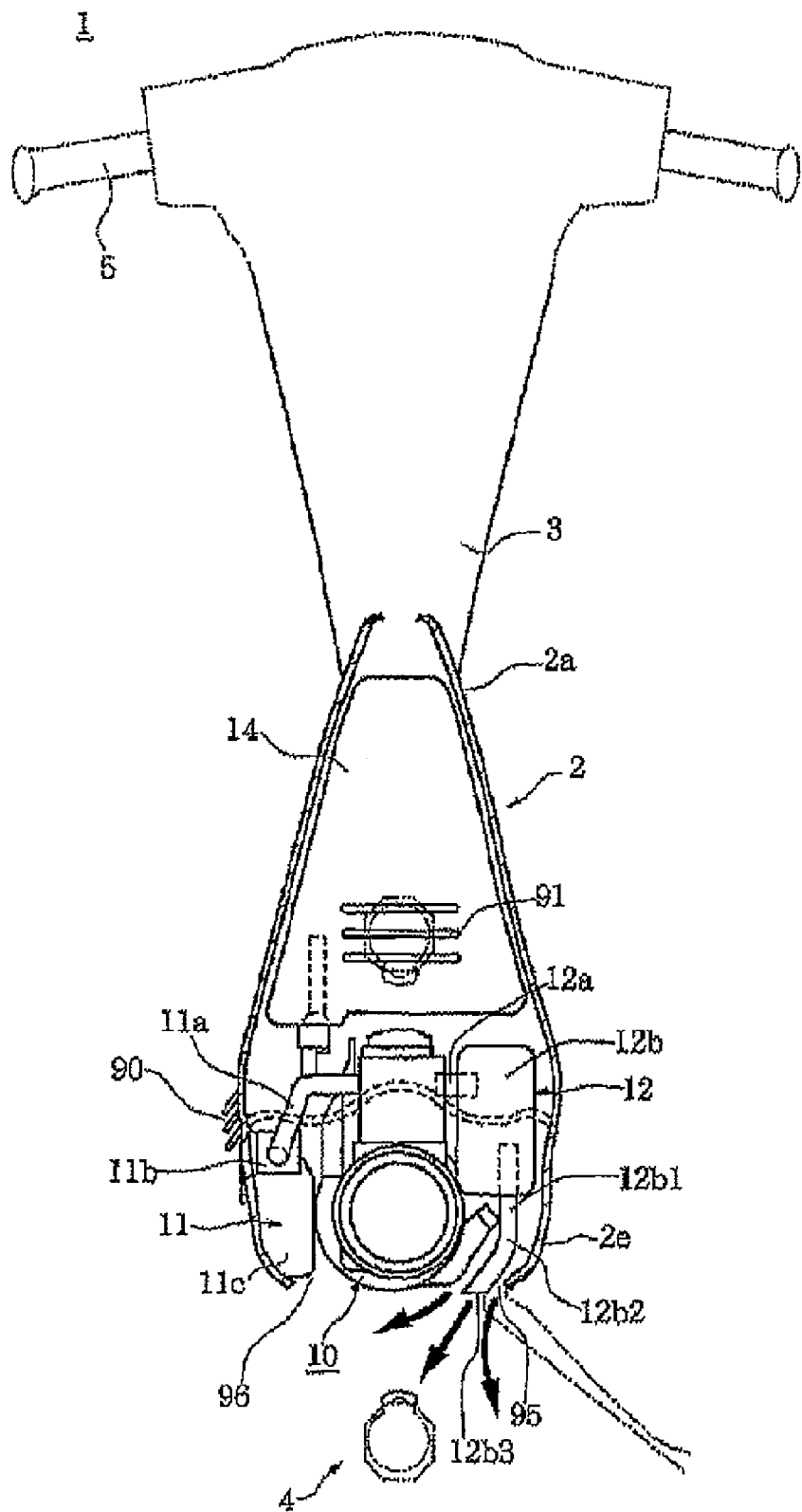
FIG. 3 is a cross sectional schematic view taken along the line III-III of FIG. 1.
Figure 4:
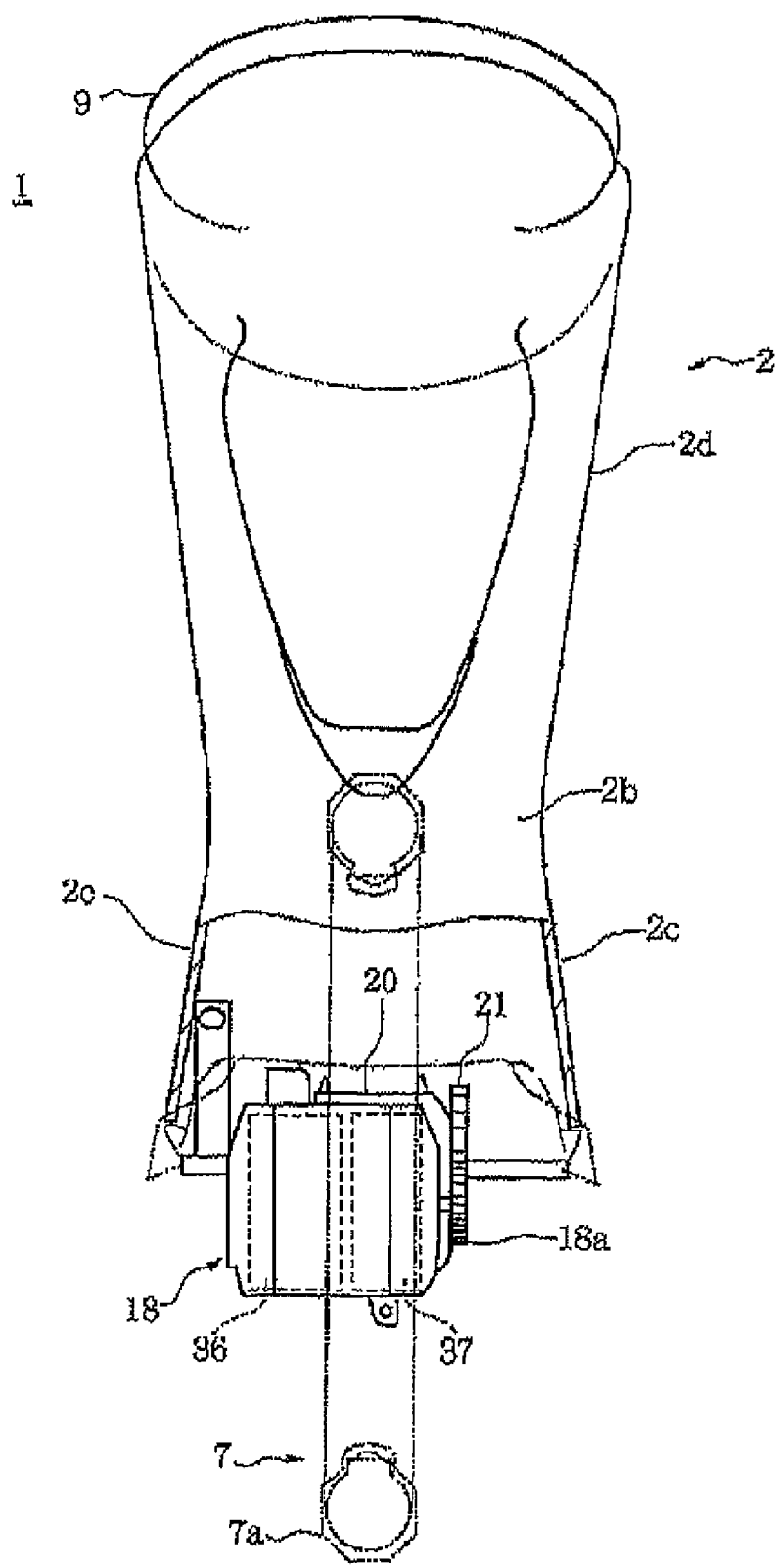
FIG. 4 is a cross sectional schematic view taken along the line IV-IV of FIG. 1.
Figure 5:
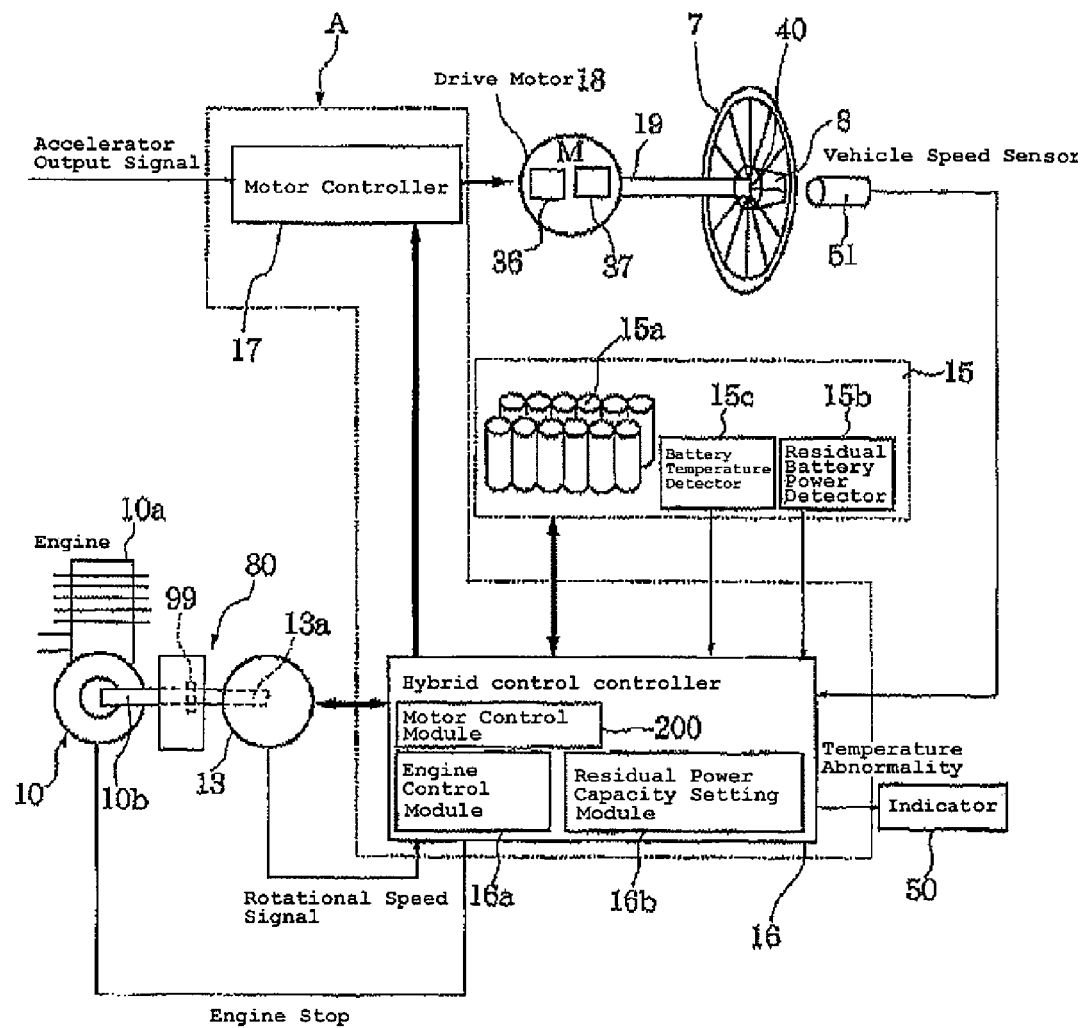
FIG. 5 is a schematic drawing of a power transmission system of the hybrid type electric vehicle.

In the following detailed description, terms of orientation such as "left," "right," "top," "bottom," "upper," "lower," "front," "rear," and "end" are used herein to simplify the description of the context of the illustrated embodiments. Likewise, terms of sequence, such as "first" and "second," are used to simplify the description of the illustrated embodiments. Because other orientations and sequences are possible, however, the present invention should not be limited to the illustrated orientation. Those skilled in the art will appreciate that other orientations and sequences of the various components are possible FIG. 1 is a side elevational schematic view of a hybrid type electric vehicle, FIG. 2 is a cross sectional schematic view taken along the line II-II of FIG. 1. FIG. 3 is a cross sectional schematic view taken along the line III-III of FIG. 1. FIG. 4 is a cross sectional schematic view taken along the line IV-IV of FIG. 1. FIG. 5 is a schematic drawing of a power transmission system of the hybrid type electric vehicle.

FIGS. 1 to 4 illustrate an electric vehicle. In the illustrated embodiment, the electric vehicle is a hybrid-type electric vehicle 1. The hybrid-type electric vehicle 1 has a vehicle body 2 with a front end portion 2a, which supports a front fork 3 for pivotal movement. The front fork 3 carries a front wheel 4, which is steerable via steering handle bars 5 disposed atop the front fork 3.

As best shown in FIG. 2, a right and left pair of arms 2c extend rearward from a rear end portion 2b of the vehicle body 2. The right and left pair of arms 2c support an axle 8 of a rear wheel 7. In a preferred embodiment, the rear wheel 7 of the vehicle 1 is the drive wheel. The rear end portion 2b of the vehicle body 2 also has a saddle pedestal 2d extending upwardly therefrom, with a saddle 9 attached to the saddle pedestal 2d.

A vehicle body footboard 2e extends between the front end portion 2a and the rear end portion 2b of the vehicle body 2. As shown in FIG. 2, the vehicle body footboard 2e has a width slightly larger than a width of the right and left pair of arms 2c to provide a foot space for a rider sitting on the saddle 9.

With continued reference to FIGS. 1 and 2, an engine 10 is preferably disposed within the interior of the vehicle body footboard 2e, with a cylinder axis of the engine 10 extending generally vertically to the ground or riding surface. An air intake system 11 is disposed on a right side of the engine 10 (looking from the rear end portion 2b toward the front end portion 2a), while an exhaust system 12 is disposed on a left side of the engine 10, both in a plan view. In a preferred embodiment, the engine 10 is an air-cooled four-stroke engine. However, other suitable engine types can be used, such as a two-stroke engine.

As shown in FIG. 2, in the illustrated embodiment the air intake system 11 has an air intake conduit 11a, a carburetor 11b and an air cleaner or filter 11c. The air intake conduit 11a is attached to a right side of a cylinder 10a of the engine 10 (looking from the rear end portion 2b toward the front end portion 2a). The carburetor 11b is positioned in communication with the air intake conduit 11a. An air introducing pipe 11d is attached to a rear portion of the air cleaner 11c. As shown in FIGS. 1 and 2, a fuel tank 14 is disposed above the engine 10 and is coupled with the carburetor 11b through a fuel supply conduit 14a. The amount of fuel supplied to the carburetor 11b is controlled via an electromagnetic valve 11b1 provided in the carburetor 11b.

In the illustrated embodiment, the exhaust system 12 has an exhaust conduit 12a and a muffler 12b. The exhaust conduit 12a is connected to a left side of the cylinder 10a of the engine 10 (looking from the rear end portion 2b toward the front end portion 2a), and the muffler 12b is connected to the exhaust conduit 12a. As best shown in FIG. 3, the muffler 12b is disposed such that an exhaust gas discharge pipe 12b1 extends downwardly therefrom. As shown in FIG. 3, the exhaust gas discharge pipe 12b1 preferably has a bent portion 12b2 oriented toward the engine side. The bent portion 12b2 defines an opening 12b3 positioned below the engine 10, and preferably discharges exhaust gases toward a portion of the ground generally under a center of the vehicle body.

Also, as shown in FIG. 2, a generator 13 is preferably disposed rearwardly of the engine 10. The generator 13 is driven by the engine 10 to generate electric power.

With continued reference to FIG. 2, an engine cooling fan 80 is positioned between the engine 10 and the generator 13. A crankshaft 10b of the engine 10 extends generally along the longitudinal axis of the vehicle and couples to a rotor shaft 13a of the generator 13 through a coupling 99, such that respective ends of the shafts 10b, 13a oppose each other. Accordingly, the drive power of the crankshaft 10b is transmitted to the rotor shaft 13a. The crankshaft 10b has the engine cooling fan 80 mounted thereon. Advantageously, because the engine cooling fan 80 is provided and it is positioned between the engine 10 and the generator 13, the engine 10 and the generator 13 can be cooled with a compact and simple structure.

The vehicle body footboard 2e of the vehicle body 2 also has a battery 15 positioned rearwardly of the generator 13. Further, a control device A, including a hybrid control controller 16 and a motor controller 17, is disposed rearwardly of the battery 15. A drive motor 18 is disposed rearwardly of the hybrid control controller 16 and the motor controller 17, and in front of a tire periphery 7a of the drive wheel 7 (looking from the rear end portion 2b toward the front end portion 2a). A sprocket 18a of the drive motor 18 is operably connected to a sprocket 21 of a wheel hub 20 of the drive wheel 7 through a chain 19. However, other suitable mechanisms can be used to operably connect the sprockets 18a, 21, such as a belt, gears, or the like.

Preferably, the drive motor 18 is positioned rearwardly of the engine 10, as shown in FIG. 1, so as to shorten a distance between the drive motor 18 and the axle 8 of the drive wheel 7.

As thus discussed, the power of the drive motor 18 is transmitted to the drive wheel 7 side through the chain 19. The power, however, can be transmitted to the drive wheel 7 side through a driveshaft. In one embodiment, the chain 19 can be a metal chain, such as one normally used for bicycles and the like. However, in other embodiments the chain 19 can be made from other suitable materials, such as rubber reinforced with carbon fibers.

As shown in FIG. 5, the battery 15 includes a number of battery cells 15a, a residual battery power detector 15b and a battery temperature detector 15c. In one embodiment, the battery cells 15a can be nickel hydrogen cells or nickel cadmium cells connected in series. However, other suitable cell types, and cell configurations, can be used. The residual battery power detector 15b is preferably in communication with the hybrid control controller 16 and sends residual battery power information to the hybrid control controller 16. The battery temperature detector 15c is likewise preferably in communication with the hybrid control controller 16 and sends battery temperature information to the hybrid control controller 16.

In the illustrated embodiment, the hybrid type electric vehicle 1 has the steerable wheel 4 and the drive wheel 7. Between the steerable wheel 4 and the drive wheel 7, the engine 10, the generator 13, the battery 15, the hybrid control controller 16, the motor controller 17 and the drive motor 18 are disposed in the interior of the vehicle body footboard 2e. The electric power generated by the generator 13, which is driven by the engine 10, and the electric power of the battery 15 are supplied to the drive motor 18. The power of the drive motor 18 is then transmitted to the drive wheel 7 to propel the vehicle 1. As best shown in FIG. 2, the wheel hub 20 of the drive wheel 7 has a transmission 40 disposed therein.

As shown in FIGS. 2, 4 and 5, the drive motor 18 in the illustrated embodiment includes a motor 36 and a transmission 37. The transmission 37 preferably varies the rotation of the motor 36 to drive the drive wheel 7.

In a preferred embodiment, the hybrid control controller 16 controls at least a charge/discharge operation of the battery 15 and an engine speed of the engine 10. As shown in FIG. 5, the controller 16 has an engine control module 16a and a residual power capacity setting module 16b for setting the residual power capacity of the battery 15. An indicator 50 is connected to the controller 16. The indicator 50 preferably has a warning lamp (not shown) and is positioned adjacent to the steering handle bar 5. When the battery 15 becomes weak (e.g., when the charge of the battery 15 drops below a certain charge value), the hybrid control controller 16 preferably activates the warning lamp, turning said lamp on. The residual power capacity setting module 16b determines when the battery 15 is "weak" based upon the residual battery power information provided by the residual battery power detector 15b.

The engine control module 16a, which is in communication with the engine 10, preferably starts the engine 10 to initiate the power generating/charging operation by the generator 13 when the residual power capacity set by the residual power capacity setting module 16b decreases below an established (e.g., preset) lower limit. Said established lower limit value can be a preset and stored, for example, in a non-volatile memory, or the value can be calculated while the vehicle 1 is operating. In contrast, the engine control module 16a stops the engine 10 to discontinue the power generating/charging operation by the generator 13 when the residual power capacity set by the residual power capacity setting means 16b reaches an established upper limit. That is, when the residual power capacity of the battery 15 decreases below the lower limit, the engine 10 drives the generator 13 until the residual power capacity reaches the upper limit so that the power generated by the generator 13 is used to charge the battery 15.

The engine control module 16a also preferably stops the engine 10 when a vehicle speed detected by a vehicle speed sensor 51 increases over an established amount (i.e., when the vehicle operates in a high speed range). Further, the engine control module 16a preferably keeps the engine 10 at a standstill when the vehicle speed sensor 51 senses that the hybrid-type electric vehicle 1 does not operate and is at a standstill.

An accelerator signal output following an operation of the accelerator by the rider is input into the motor controller 17. The motor controller 17 preferably controls the power transmitted by the drive motor 18 to the drive wheel 7 so that the transmitted power is generally proportional to the magnitude of the operation of the accelerator.

In the illustrated embodiment, the engine 10 starts-up when the generator 13 drives the crankshaft 10b, and stops when the hybrid control controller 16 opens an ignition circuit.

In this embodiment, an operational speed range of the vehicle 1 can be broad because the drive motor 18 incorporates the transmission 37, the axle of the drive wheel 7 has the transmission 40, and the chain 19 transmits the power of the drive motor 18 to the drive wheel 7 side. Accordingly, the drive motor 18, even if it is small, can efficiently achieve the maximum speed while assuring a sufficient start performance.

Because both of the drive motor and the drive wheel have transmissions 37, 40 of their own, the structures of the transmissions 37, 40 can be compact and simple. In addition, the transmissions 37, 40 can be incorporated while minimizing the weight increase of the drive wheel side of the vehicle 1.

The transmissions 37, 40 can preferably keep a running performance of the vehicle 1 in a sufficient speed range, even where a drive motor with a small maximum power or a small rated power is used. Therefore, a hybrid-type electric vehicle 1 with a small engine prime mover, which is energy-saving, clean because of small exhaust gases, compact and light can be constructed.

The transmissions 37, 40 are preferably automatic transmissions and can further simplify the operation made by the operator of the vehicle 1. Thus, the operation performance and the running performance of the vehicle 1 can be enhanced. Alternatively, only one of the transmissions 37, 40 can be an automatic transmission. Also, in one embodiment, a driveshaft can replace the chain 19 to transmit power from the drive motor 18 to the drive wheel 7 side.

In the illustrated embodiment of the hybrid-type electric vehicle 1, the engine 10, the generator 13, the battery 15, the control device A, and the drive motor 18 are positioned in this order, fore to aft (looking from the front end portion 2a to the rear end portion 2b), and in series in the interior of the vehicle body foot board 2e. Accordingly, the vehicle body 2 can be slim. Accordingly, air resistance of the vehicle body 2 can be drastically reduced. In addition, because the engine 10, the generator 13, the battery 15, the control device (A) and the drive motor 18 are linearly positioned, conduits and wires connected to those components can have reduced lengths, in comparison with vehicles wherein such components are not linearly positioned relative to each other. Electrical resistance also can be minimized together with the reduced lengths of the wires.

As shown in FIG. 1, the vehicle body footboard 2e is positioned lower than a line L1 connecting upper ends of the steerable wheel 4 and the drive wheel 7 to each other. Accordingly, the air resistance of the vehicle body can be drastically reduced.

As shown in FIG. 3, the vehicle body footboard 2e has a cooling air inlet opening 90 positioned at a side portion on the air intake system side allowing the introduction of cooling air into the vehicle body footboard 2e. Another cooling air inlet opening 91 is positioned above, and in front of, the engine 10 (see FIG. 1). A third cooling air inlet opening 92 is positioned below the drive motor 18. As shown in FIG. 3, the vehicle body footboard 2e has a further cooling air inlet opening 96 positioned below the air intake system 11, and has a cooling air discharge opening 95 positioned below the exhaust system 12, through which the cooling air is discharged after cooling the components disposed within the vehicle body footboard 2e.

When the hybrid type electric vehicle 1 operates, the interior of the vehicle body footboard 2e preferably has a negative pressure due to the operation of the engine cooling fan 80. Thus, as shown in FIG. 3, cooling air is introduced through the cooling air inlet opening 90 from the side portion on the air intake system 11, through the cooling air inlet opening 91 from above and in front of the engine 10, and through the cooling air inlet opening 96 from below the air intake system 11. Also, as shown in FIG. 2, cooling air is introduced through the cooling air inlet opening 92 from below the drive motor 18. The cooling air preferably cools at least one of the drive motor 18, the control device A, the battery 15, the generator 13 and the engine 10. The cooling air can also cool the exhaust conduit 12a and the muffler 12b, which form the exhaust system 12, in this order, i.e., from the component which has a lower temperature. The cooling efficiency thus can be improved. Because sufficient cooling can be achieved with a simple structure (e.g., a fan and cooling air inlet openings), such a compact, light and inexpensive hybrid vehicle can be constructed.

Figure 6:
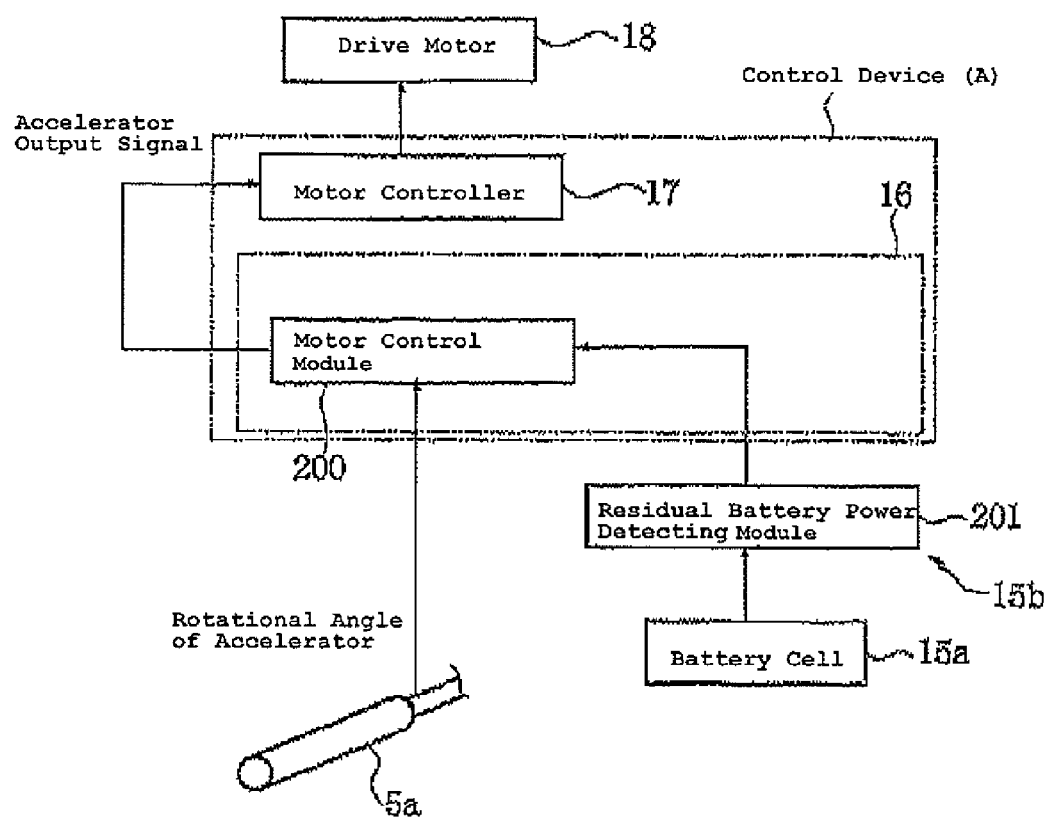
FIG. 6 is a block diagram showing a schematic construction of one aspect of the invention.

In the embodiment shown in FIG. 6, the electric vehicle 1 includes a residual battery power detecting module 201 formed with the residual battery power detector 15b for detecting a residual power capacity of the battery 15, and a motor control module 200. When a user operates the accelerator 5a of the vehicle 1 to accelerate or decelerate the vehicle 1, an accelerator output signal is output in response to the rotational angle of the accelerator 5a. When the residual power capacity decreases below the lower capacity limit, the motor control module 200 preferably lowers a voltage of said accelerator output signal to a value less than a voltage given under a condition where the residual power capacity is greater than or equal to an established (e.g., preset) lower limit, so as to control a rotational speed of the drive motor 18.

In the illustrated embodiment, the hybrid control controller 16 has the motor control module 200, and the battery 15 has the residual battery power detecting module 201. However, in another embodiment, the hybrid control controller 16 can have the residual battery power detecting module 201.

Figure 7:
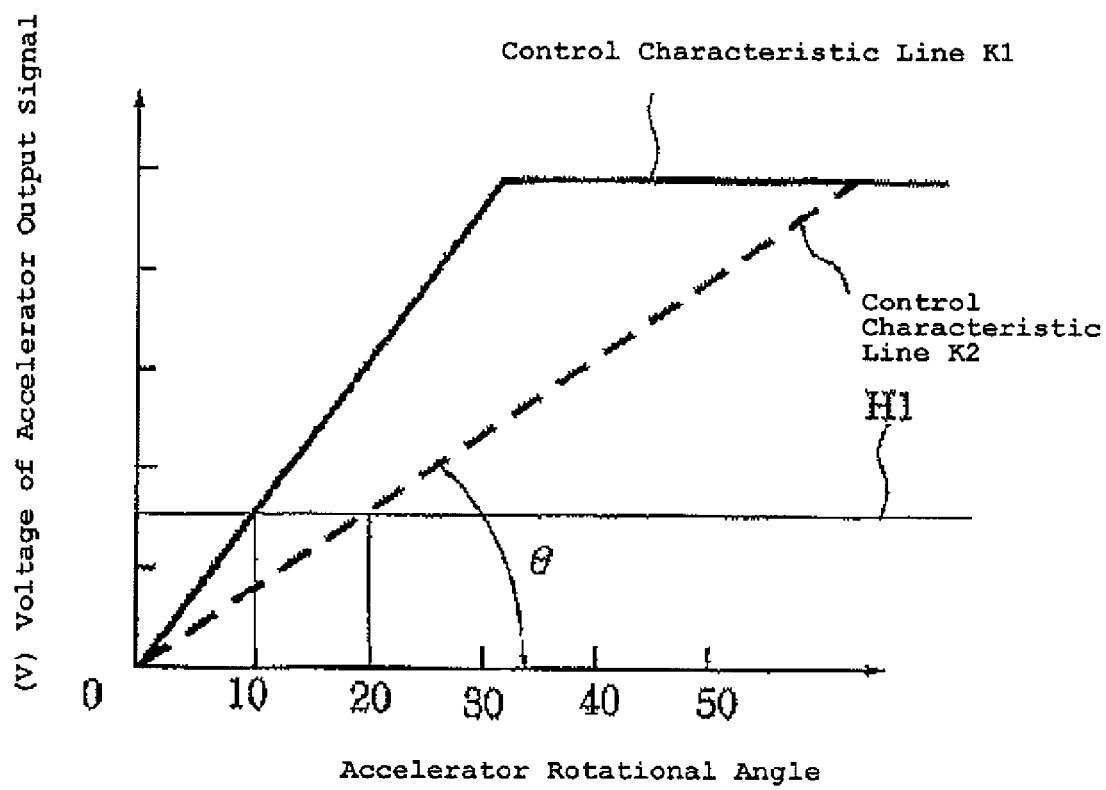
FIG. 7 is a graph showing a relationship between an accelerator rotational angle and an accelerator output signal.

As shown in FIG. 7, the motor control module 200 preferably increases a voltage V of the accelerator output signal in response to a rotational angle θ of the accelerator 5a, to control the rotational speed of the drive motor 18. This rotational speed control is made in accordance with a control characteristic line K1, and the voltage V reaches the maximum at an established (e.g., preset) accelerator rotational angle θ. In the illustrated embodiment, the voltage V reaches the maximum voltage when the accelerator 5a is rotated approximately 32°. However, other established accelerator rotational angles θ angle values can be used for the maximum voltage V. Normally, the rider rotates the accelerator 5a approximately 0 to 30 degrees to control the rotational speed of the drive motor 18.

When the residual power capacity decreases below the established lower capacity limit, the motor control module 200 preferably controls the rotational speed of the drive motor 18 in accordance with the control characteristic line K2. For example, if a running speed H1 corresponding to an accelerator rotational angle θ of 10 degrees in the control characteristic line K1 needs to be maintained, the rotational angle θ of the accelerator 5a is required to be 20 degrees in the control characteristic line K2 when the residual power capacity decreases below the lower capacity limit. Accordingly, when the residual power capacity decreases below the established lower capacity limit, the accelerator 5a must be rotated more (i.e., the accelerator rotational angle θ is greater) to achieve the same running speed as when the residual power capacity is at or above the established lower limit.

Accordingly, the residual power capacity of the battery 15 can be communicated to the rider in the form of the response from the accelerator 5a, without any indications on a meter panel or the like. Accordingly, the user can receive a sensory feedback of the condition of the vehicle 1 (e.g., the amount of residual power capacity of the battery 15) based on how much the user needs to rotate the accelerator 5a to maintain a desired running speed. Such sensory feedback is particularly advantageous for a rider of a motorcycle, who needs to pay more attention to a forward location in comparison with a driver of a four-wheeled vehicle. For the rider to maintain concentration on driving the vehicle 1, the response of the accelerator 5a is more useful in communicating the residual power capacity of the battery 15 to the rider than communicating the residual power capacity via, for example, a panel. Also, if the electric power is consumed at a rate greater than the generator's capacity to generate power, the power output to the drive motor 18 can be restricted in proportion to a residual amount before starting power generation/charging operations to manage the battery power capacity.

While the illustrated embodiment discloses the controller 16 varying a voltage output from the accelerator 5a when controlling the operation of the drive motor 18, one of ordinary skill in the art will recognize that the controller 16 could also control the operation of the drive motor 18 using a digital output from the accelerator 5a. Accordingly, the embodiments discloses herein describing systems and methods for varying the voltage output from the accelerator 5a to control the operation of the drive motor 18 are equally applicable to the variation of a digital output from the accelerator 5a to control said drive motor 18.

Figure 8:
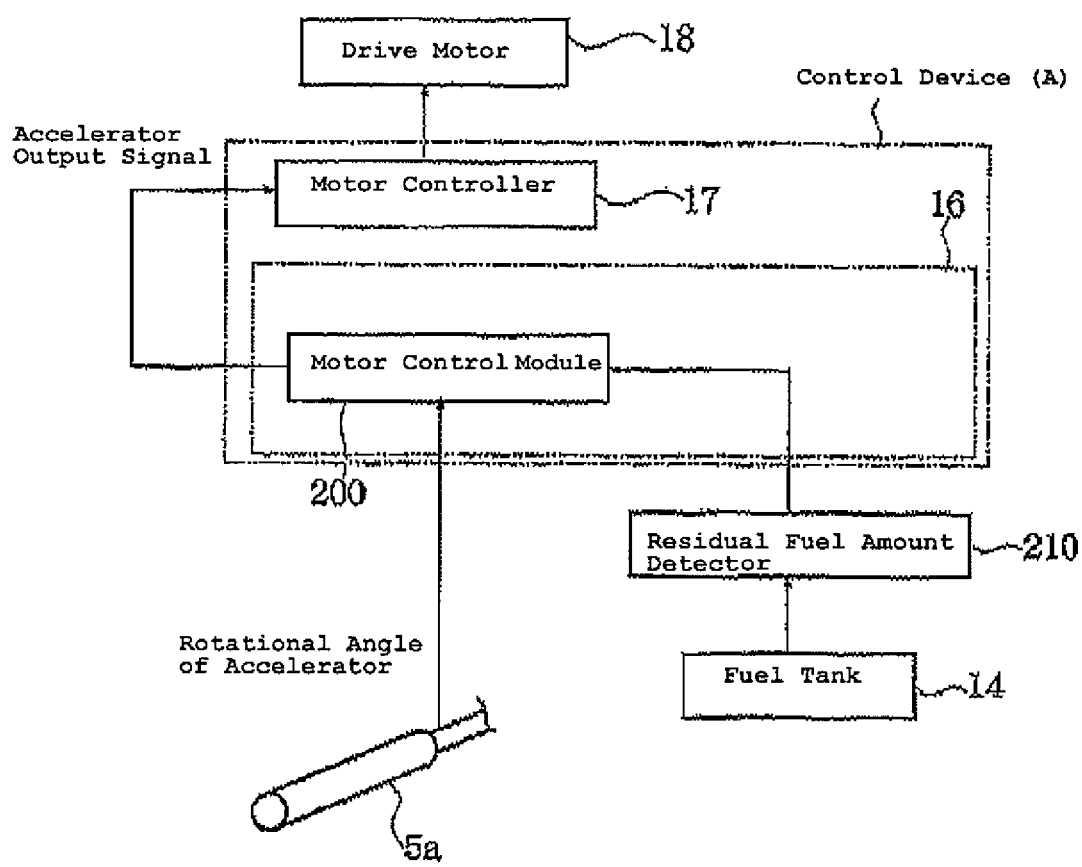
FIG. 8 is a block diagram showing a schematic construction of another aspect of the invention.

In the embodiment illustrated in FIG. 8, the electric vehicle 1 includes a residual fuel detector 210 for detecting a residual fuel amount of the fuel tank 14, and the motor control module 200. When the residual fuel amount decreases below a lower limit, the motor control module 200 preferably lowers the voltage of the accelerator output signal, which is output in response to the rotational angle of the accelerator 5a, to a value less than a voltage given under a condition where the residual fuel amount is greater than or equal to an established (e.g., preset) lower limit, so as to control the rotational speed of the drive motor 18.

In the illustrated embodiment, the hybrid control controller 16 has the motor control module 200, and the fuel tank 14 has the residual fuel detector 210.

With reference to FIG. 7, in this embodiment, when the residual fuel amount decreases below the lower limit, the motor control means 200 controls the rotational speed in accordance with the control characteristic line K2. For example, if the running speed H1 corresponding to an accelerator rotational angle θ of 10 degrees in the control characteristic line K1 needs to be maintained, the rotational angle θ of the accelerator 5a is required to be 20 degrees in the control of the control characteristic line K2 when the residual fuel amount decreases below the lower limit. Accordingly, when the residual fuel amount decreases below the established lower limit, the accelerator 5a must be rotated more (i.e., the accelerator rotational angle θ is greater) to achieve the same running speed as when the residual fuel amount is greater than or equal to the established lower limit.

Accordingly, the residual fuel amount can be communicated to the rider via the response from the accelerator 5a, without any indications on a meter panel or the like. The user can thus receive a sensory feedback of the condition of the vehicle 1 (e.g., the residual fuel amount in the fuel tank 14) based on how much the user needs to rotate the accelerator 5a to maintain a desired running speed. As noted above, such sensory feedback is particularly advantageous for a rider of a motorcycle, who needs to pay more attention to a forward location in comparison with a driver of a four-wheeled vehicle. Therefore, it is more useful to communicate the residual fuel amount to the rider via the response of the accelerator 5a than via, for example, a panel.

Figure 9:
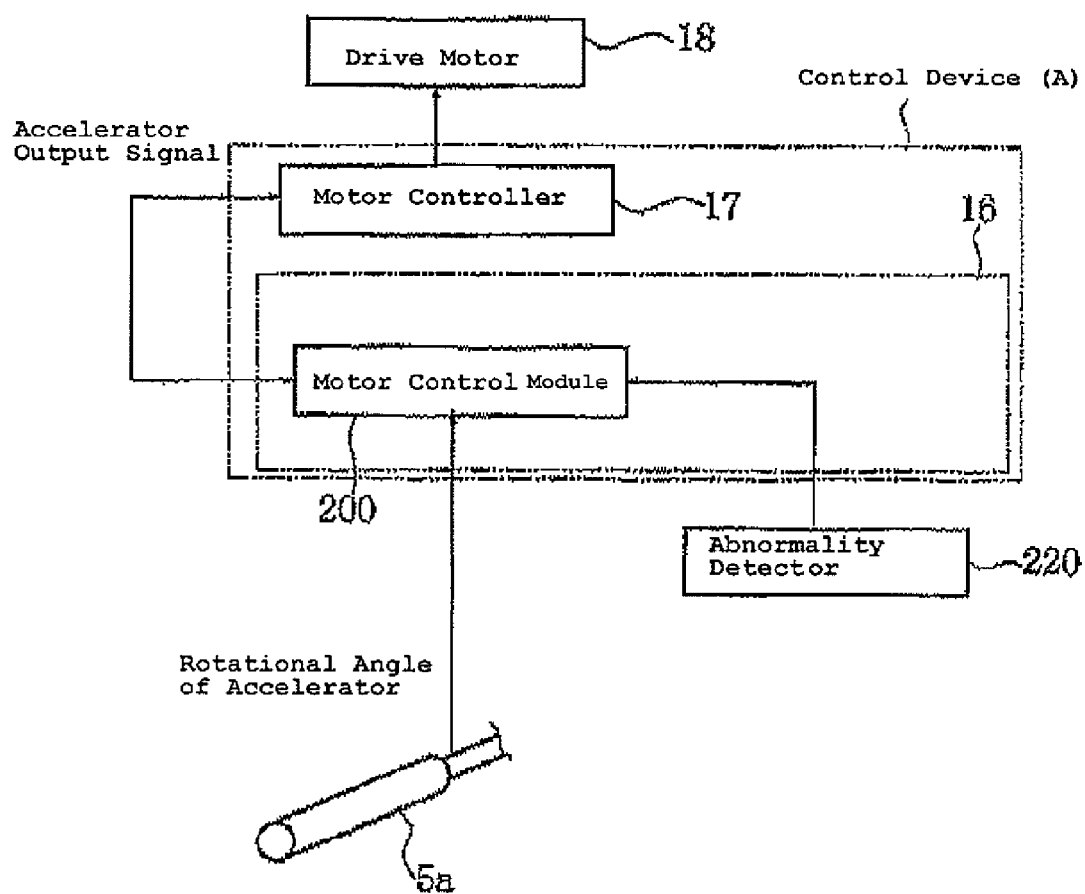
FIG. 9 is a block diagram showing a schematic construction of another aspect of the invention.

In the embodiment illustrated in FIG. 9, the electric vehicle 1 includes an abnormality detector 220 for detecting an abnormality of the vehicle 1, and the motor control module 200. The abnormality detector 220 preferably detects an abnormality such as, for example, an abnormal engine temperature, insufficient fuel or a weak battery. However, the abnormality detector 220 can detect abnormal operation of other components of the vehicle 1. When an abnormality is detected, the motor control module 200 preferably lowers the maximum voltage of the accelerator output signal, which is output in response to the rotational angle of the accelerator 5a, to a value less than the maximum voltage given under a normal operating condition, so as to control the rotational speed of the drive motor 18.

In this embodiment, the hybrid control controller 16 has the motor control module 200, and the engine 10 or the like has the abnormality detector 220.

Figure 10:
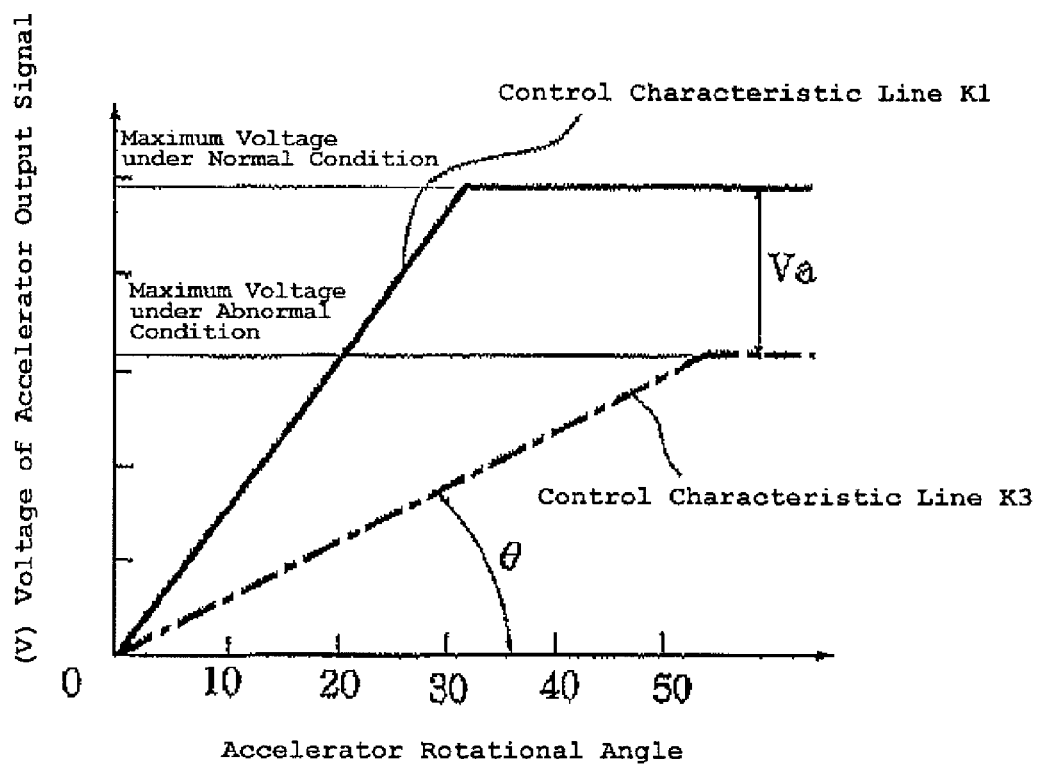
FIG. 10 is a graph showing a relationship between an accelerator rotational angle and an accelerator output signal.

As shown in FIG. 10, when the abnormality is detected, the motor control module 200 controls the rotational speed in accordance with the control characteristic line K3 to lower the maximum voltage of the accelerator output signal to be less than the established maximum voltage value. Thus, under the abnormal operating condition, a maximum running speed that is achievable under the normal condition cannot be obtained. That is, because the maximum voltage achievable during normal operating conditions cannot be achieved when an abnormality occurs, even if the rotational angle θ of the accelerator 5a is increased, the abnormality can be communicated to the rider via the response to the operation of the accelerator 5a without any indications on a meter panel or the like. Such a sensory mode of indicating the abnormality to the rider advantageously allows the rider to gauge the operating condition of the vehicle 1 while maintaining concentration on driving the vehicle 1.

Figure 11:
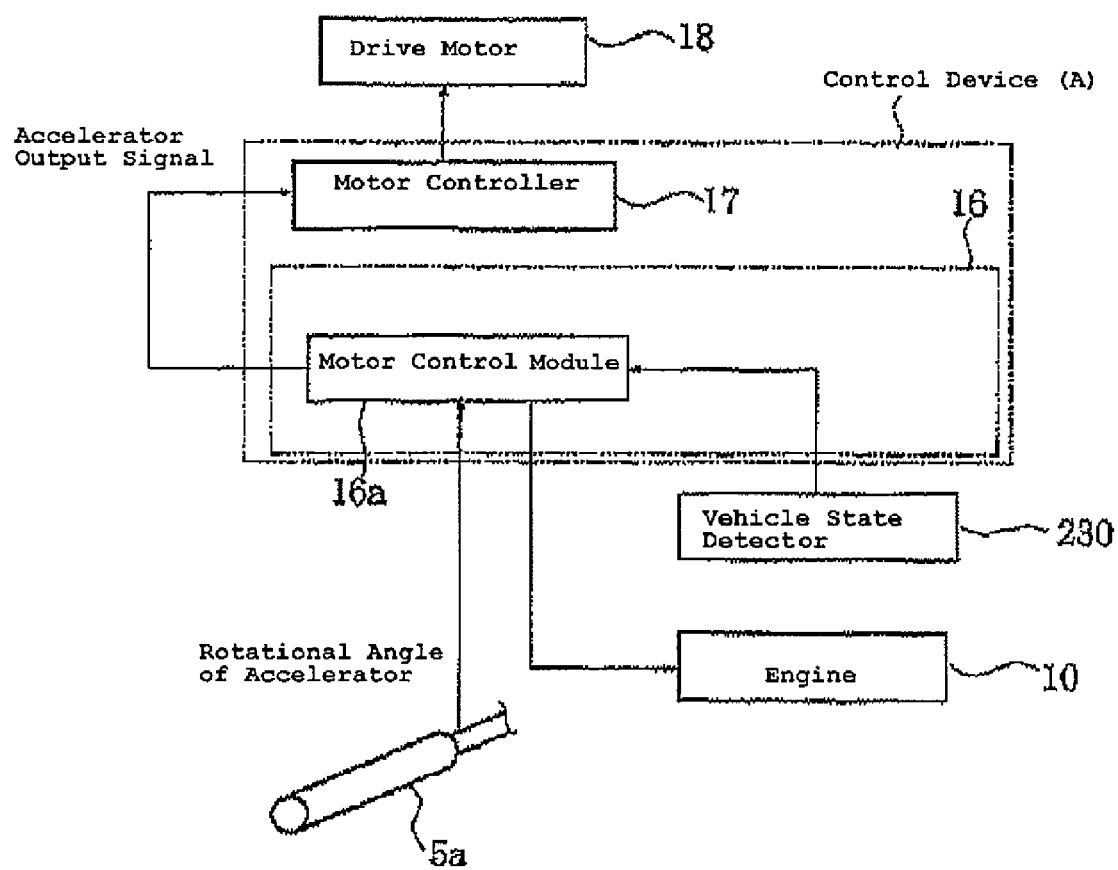
FIG. 11 is a block diagram showing a schematic construction of another aspect of the invention.

In the embodiment illustrated in FIG. 11, the electric vehicle 1 includes a vehicle state detector 230 for detecting a vehicle state, and an engine control module 16a for changing an engine speed of the engine 10 in response to a detection result of the vehicle state. The vehicle state detector 230 preferably detects vehicle state parameters such as, for example, vehicle speed, engine temperature, residual fuel amount or battery condition. However, the vehicle state detector 230 can detect other vehicle state parameters. In this embodiment, the hybrid control controller 16 has the engine control module 16a, and the engine 10 or the like has the vehicle state detector 230.

Figure 12:
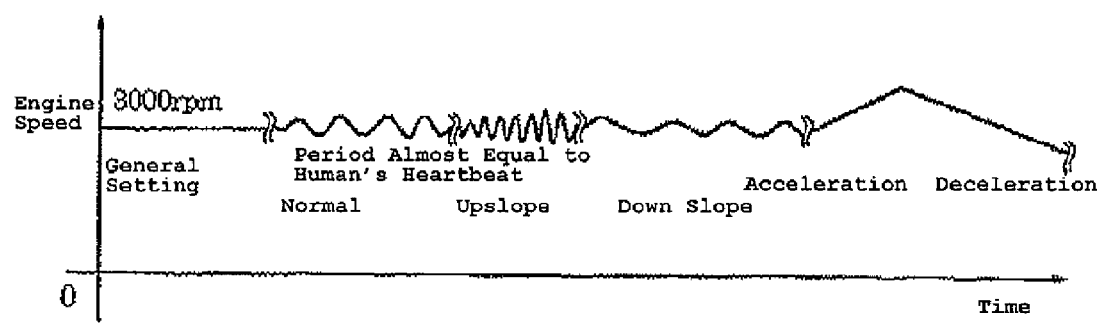
FIG. 12 is a graph showing a condition under which an engine speed is changed in response to a vehicle state.

As shown in FIG. 12, for example, the engine control module 16a controls the engine 10 to provide an engine speed having a rotational fluctuation characteristic during a normal operation of the vehicle 1, although conventionally only a preset engine speed is provided based upon a general setting. The rotational fluctuation is controlled, for example, as described below.

During normal operation of the vehicle 1, for example, the sinusoidal rotational fluctuation similar to that of a human's heartbeat is provided to the engine speed. The period of the fluctuation decreases, and the amplitude of the fluctuation increases, when the vehicle ascends an upslope, while the period increases, and the amplitude decreases, when the vehicle descends a down slope. Also, the engine speed characteristic is generally linear, and no wavering rotational fluctuation control is made during an acceleration or deceleration operation. However, in another embodiment, the period of the fluctuation can increase when ascending an upslope, and the period of the fluctuation can decrease when descending a down slope. Accordingly, the running speed control can include different modes selected in accordance with preference of the rider.

As thus discussed, the engine speed of the engine 10 is changed in response to the detected vehicle state. Accordingly, vibrations and sounds of the engine 10 are intentionally changed in response to the vehicle state (e.g., a vehicle speed, a temperature, a residual gasoline amount, a battery condition, etc.) in order to be communicated to the rider. For instance, when the vehicle comes to an upslope and operates with both the power of the battery and the power generated by the engine, if the residual battery power approaches the established (e.g., preset) lower limit, the engine speed can be increased, or the engine speed can have the periodic change and the period is shortened so that the rider can feel the driving state. Thereby, the vehicle condition can be communicated to the rider in a sensory or intuitive manner, without a meter panel or the like.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. An electric vehicle comprising:
   an engine-driven generator;
   a battery connected to the generator;
   an electric drive motor propelling the vehicle, the drive motor being driven with electric power generated by the engine-driven generator and electric power from a battery;
   a residual battery power detector cooperating with the battery to detect a residual power capacity of the battery;
   an accelerator operated by a user to control vehicle speed, the accelerator outputting a control signal indicative of a desired motor speed set by the user; and
   a hybrid controller managing the operation of the drive motor based upon the control signal output by the accelerator and upon a signal from the residual battery power detector, wherein the controller is configured to operate the drive motor, for a given control signal value, at a slower rotational speed when the residual power capacity of the battery falls below an established lower limit than when the residual power capacity is greater than or equal to the established lower limit.

2. The electric vehicle of claim 1, wherein the accelerator output signal is output in response to a rotational angle of an accelerator.

3. The electric vehicle of claim 2, wherein the rotational angle of the accelerator required to maintain a desired vehicle speed is greater when the residual battery power capacity is less than the established lower limit than when the residual batter power capacity is greater than or equal to the established lower limit.

4. The electric vehicle of claim 3, wherein said accelerator outputs a voltage control signal, and wherein the controller lowers a voltage value of the control signal when the residual power capacity of the battery falls below the established lower limit.

5. The electric vehicle of claim 1, wherein the residual battery power detector comprises a residual battery power detection module.

6. The electric vehicle of claim 1, wherein the controller comprises a motor control module that receives said accelerator control signal and lowers the value of said control signal when the residual power capacity of the battery decreases below the established lower limit.

* * * * *

UNITED STATES PATENT AND TRADEMARK OFFICE
CERTIFICATE OF CORRECTION

PATENT NO. : 7,478,692 B2
APPLICATION NO. : 11/429116
DATED : January 20, 2009
INVENTOR(S) : Jun Taue, Gen Mizutani and Kiyohisa Sugii It is certified that error appears in the above-identified patent and that said Letters Patent is hereby corrected as shown below:

At Column 3, line 29, after "possible", insert --.--.

At Column 9, line 44, please change "5a" to --5a,--.

At Column 10, line 32, please change "examples,,it" to --examples, it--.

Signed and Sealed this

Ninth Day of June, 2009

JOHN DOLL
*Acting Director of the United States Patent and Trademark Office*